June 23, 1970 R. R. CANDOR ET AL 3,516,350
COOKING APPARATUS HAVING ELECTROSTATIC MEANS
Original Filed Jan. 31, 1968

INVENTORS
ROBERT R. CANDOR &
JAMES T. CANDOR

United States Patent Office 3,516,350
Patented June 23, 1970

3,516,350
COOKING APPARATUS HAVING
ELECTROSTATIC MEANS
Robert R. Candor, Miami Township, Ohio (5940 Munger Road, Dayton, Ohio 45459), and James T. Candor, Washington Township, Ohio (544 Cynthia Lane, Dayton, Ohio 45429)
Original application Jan. 31, 1968, Ser. No. 701,946. Divided and this application June 6, 1969 Ser. No. 841,180
Int. Cl. A47j 27/00; F27d 11/00; A21b 1/22
U.S. Cl. 99—444     6 Claims

ABSTRACT OF THE DISCLOSURE

A cooking apparatus having heating means and support means to support article means to be effected by the output of the heating means. Electrode means are carried by the apparatus to be disposed in electrically spaced relation to the article means. A potential differential is imposed between the article means and the electrode means to tend to cause soiling particles of the article means to move toward the electrode means during the heating thereof by the heating means to tend to prevent soilage of the cooking apparatus.

---

This application is a divisional patent application of its copending patent application, Ser. No. 701,946, filed Jan. 31, 1968, now Pat. No. 3,470,716, which, in turn, is a continuation-in-part of its copending patent application, Ser. No. 639,354, filed May 18, 1967, now Pat. No. 3,405,452, which, in turn, is a continuation-in-part of its copending patent application, Ser. No. 532,266, filed Mar. 7, 1966, now Pat No. 3,330,136, which, in turn, is a continuation-in-part of its copending patent application, Ser. No. 219,587, filed Aug. 27, 1962, now Pat. No. 3,238,750.

This invention relates to an improved cooking apparatus and the like.

In particular, one embodiment of this invention provides a cooking apparatus having heating means and support means to support article means that is to be effected by the output of the heating means. Electrode means are carried by the apparatus and are disposed in electrically spaced relation to the article means. Means are provided for imposing a potential differential between the article means and the electrode means to tend to cause soiling particles of the article means to move toward the electrode means during the heating thereof by the heating means to tend to prevent soiling of the cooking apparatus by such particles.

Accordingly, it is an object of this invention to provide an improved cooking apparatus or the like having one or more of the novel features set forth above as hereinafter shown or described.

Other objects, uses and advantages of this invention are apparent upon a reading of this description which proceeds with reference to the accompanying drawings forming a part thereof and wherein.

Figures 1, 2:
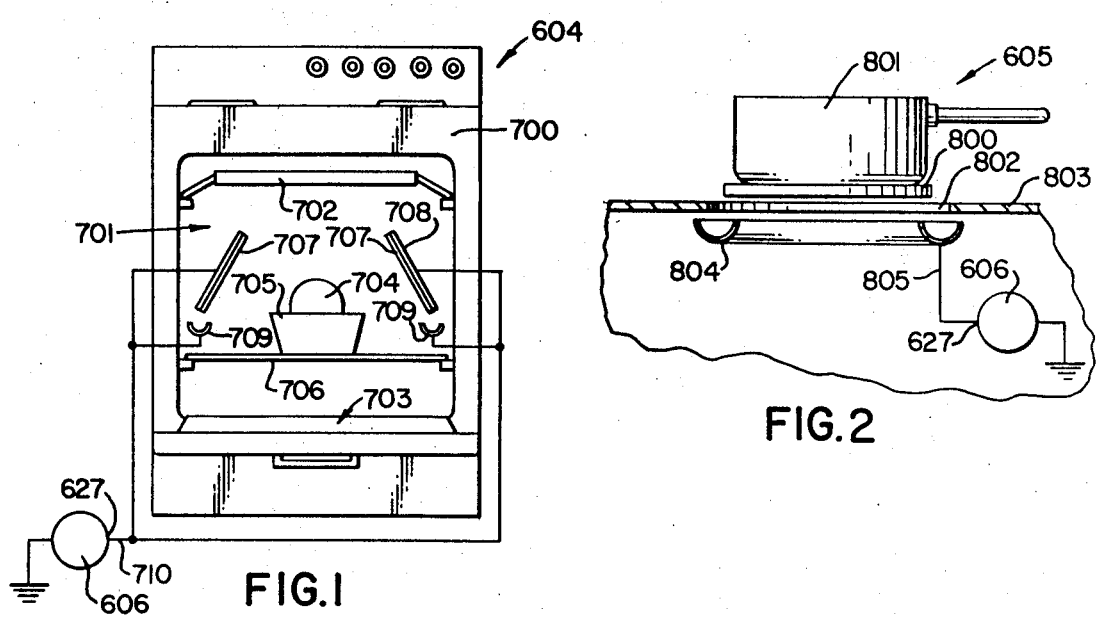
FIG. 1 is a front schematic view of a cooking oven or apparatus of this invention.
FIG. 2 is a fragmentary cross-sectional view illustrating another cooking apparatus of this invention.

A cooking oven 604 is schematically illustrated and is generally indicated by the reference numeral 604 in FIG. 1 and can comprise an outer casing structure 700 defining a conventional oven cavity 701.

The oven cavity 701 can be provided with conventional broil heating means 702 and bake heating means 703 in order to cook food 704 or the like disposed in a suitable cooking receptacle or pan 705 and being supported on conventional rack means 706 of the cooking apparatus 604.

However, it is well known that during normal cooking operations of an oven or the like, cooking soil collects on the interior walls of the oven cavity 701 which must be subsequently cleaned.

Accordingly, it is a feature of this invention to tend to reduce such cooking soil on the interior walls of the cooking cavity 701 by utilizing the electrostatic or potential differential feature of this invention.

For example, a pair of electrode plates 707 are disposed in the oven cavity 701 and are electrically insulated from the casing 700 while being disposed at an angle so that the outside surface 708 thereof can be covered with insulated material to prevent radiant heating thereof by the broil burner 702.

A pair of collecting troughs 709 are each associated with each plate 707 and are electrically insulated from the oven casing 700.

The electrode plates 707 and associated troughs 709 are respectively adapted to be interconnected to one side 607 of the electrostatic device 606 as suitable lead means 710 as illustrated whereby one potential can be imposed on the plates 707 and troughs 709 by the electrostatic device 606 during the cooking operations.

In this manner, as the food 704 is being cooked in the oven 701, the particles thereof that normally tend to leave the food 704 and splatter against and soil the internal surface means of the oven 701 will be at ground potential and, therefore, will be attracted toward the plates 707 by the aforementioned potential differential being created therebetween by the electrostatic device 606 whereby such soiling particles will collect on and soil the plate means 707 and if a too large amount of such soiling products collect on the plate means 707 so as to tend to drip off the same, the dripping soiling products will drip into the troughs 709 to be retained therein by the potential being imposed thereon by the electrostatic device 606.

Therefore, it is believed that most of the oven soiling particles produced during cooking operations in the oven 701 will be collected on the plates 707 so that the housewife or the like need only clean such plates 707 in a periodic manner without requiring complete cleaning of the entire interior surface walls of the oven 701.

In particular, the plates 707 and/or troughs 709 can be so constructed and arranged that the same are readily insertible and removable from the oven 701 so that the same can be more readily cleaned at the kitchen sink or the like.

Also, it may be found that the electrode plates 707 could actually comprise sheets of aluminum foil whereby the same could be readily disposable and need not be cleaned because the same could be replaced by new sheets of aluminum foil from the conventional aluminum foil rolls that housewives or the like utilize in their kitchens for food wrapping purposes and the like.

While the cooking apparatus 604 has been previously described as having the food 704 at ground potential while the electrode means 707 and 709 are at one potential, it is to be understood that the apparatus 604 could be so constructed and arranged that the supporting racks 706 thereof could have an equal and opposite potential imposed thereon by the electrostatic device 606 being electrically interconnected to the support means 706 thereof or the like so that the soiling particles would have one potential imposed thereon by the electrostatic device 606 to more readily tend to cause the same to collect on the electrodes 707 having an equal and opposite potential disposed thereon by the electrostatic device 606.

While the above described operation takes place during a cooking operation, it is to be understood that such electrode means 707 could be utilized during a high temperature burn-off cleaning operation to collect soiling particles as the same are effected by the heating means and leave the interior surface means of the oven 701 so that the same will not be redeposited on another part of the surface means to be required to be removed by the heating operation. Thus, it can be seen when viewing FIG. 1, soilage from previous cooking operations will be deposited on the interior surface means of the oven 701 and will be subject to a heating operation by the heating means 702 and/or 703 during a burn-off cleaning operation whereby soiling particles from the soilage on the interior surface means will be driven outwardly therefrom by the heating means and will be collected by the electrode means 707 in the manner previously described.

It is also believed that such electrostatic potential differential feature can be utilized in preventing soilage in a range top cooking operation. Accordingly, a range top 605 is schematically illustrated in FIG. 2 and comprises a top heating element means 800 for supporting and heating a cooking vessel 801 in a conventional manner.

However, as normally occurs during range top cooking operation, cooking splatter and spillage can occur whereby such spillage is normally permitted to pass through an opening means 802 in the range top frame 803 to be received in a collecting pan 804. Sometimes the soiling products collected in such pan 804 are themselves further heated by the heating means 800 so as to cause further splattering and soiling against the frame structure 803 as well as into the kitchen proper.

It is believed, according to the teachings of this invention, that the electrostatic device 606 could have one side 607 thereof electrically interconnected to the collecting plate means 804 by a lead 805 to impose a potential thereon which would cause the dish means 804 to more readily collect the soiling products within and retain the same therein by the aforementioned potential differential feature.

While the form of the invention now preferred has been disclosed as required by the statutes, other forms may be used, all coming within the scope of the claims which follow.

What is claimed is:

1. In a cooking apparatus having heating means and support means to support article means to be affected by the output of said heating means, the improvement comprising electrode means carried by said apparatus to be disposed in electrically spaced relation to said article means, and means for imposing a potential differential between said article means and said electrode means to tend to cause soiling particles of said article means to move toward said electrode means during the heating thereof by said heating means to tend to prevent soilage of said cooking apparatus.

2. In a cooking apparatus as set forth in claim 1, said last-named means imposing one potential on said electrode means and an opposite potential on said particles.

3. In a cooking apparatus as set forth in claim 1, said apparatus having an oven, said heating means and said electrode means being disposed in said oven.

4. In a cooking apparatus as set forth in claim 1, said apparatus having a range top, said heating means being a top heating element means for said range top.

5. In a cooking apparatus having heating means for an oven and interior surface means of said oven to support soilage to be affected by the output of said heating means, with said soilage having resulted from previous cooking operations in said oven, the improvement comprising electrode means carried by said apparatus to be disposed in electrically spaced relation to said soilage, and means for imposing a potential differential between said soilage and said electrode means to tend to cause soiling particles of said soilage to move toward said electrode means during the heating thereof by said heating means to tend to prevent soilage of said cooking apparatus, said heating means being adapted to elevate the temperature in said oven to a temperature that causes said soilage to leave said surface means in the form of smoke and particles whereby said electrode means attracts said particles.

6. In a cooking apparatus as set forth in claim 5, said heating means and said electrode means being disposed in said oven.

References Cited
UNITED STATES PATENTS

| | | | |
|---|---|---|---|
| 2,454,370 | 11/1948 | Beaubien | 219—396 X |
| 2,565,454 | 8/1951 | MacKenzie et al. | 55—101 X |
| 2,604,936 | 7/1952 | Kaehni et al. | 263—52 |
| 2,762,893 | 9/1956 | Long | 219—10.55 |
| 3,470,716 | 10/1969 | Candor et al. | 68—4 |

VOLODYMYR Y. MAYEWSKY, Primary Examiner

U.S. Cl. X.R.

55—2, 101, 385; 219—393, 443